United States Patent Office.

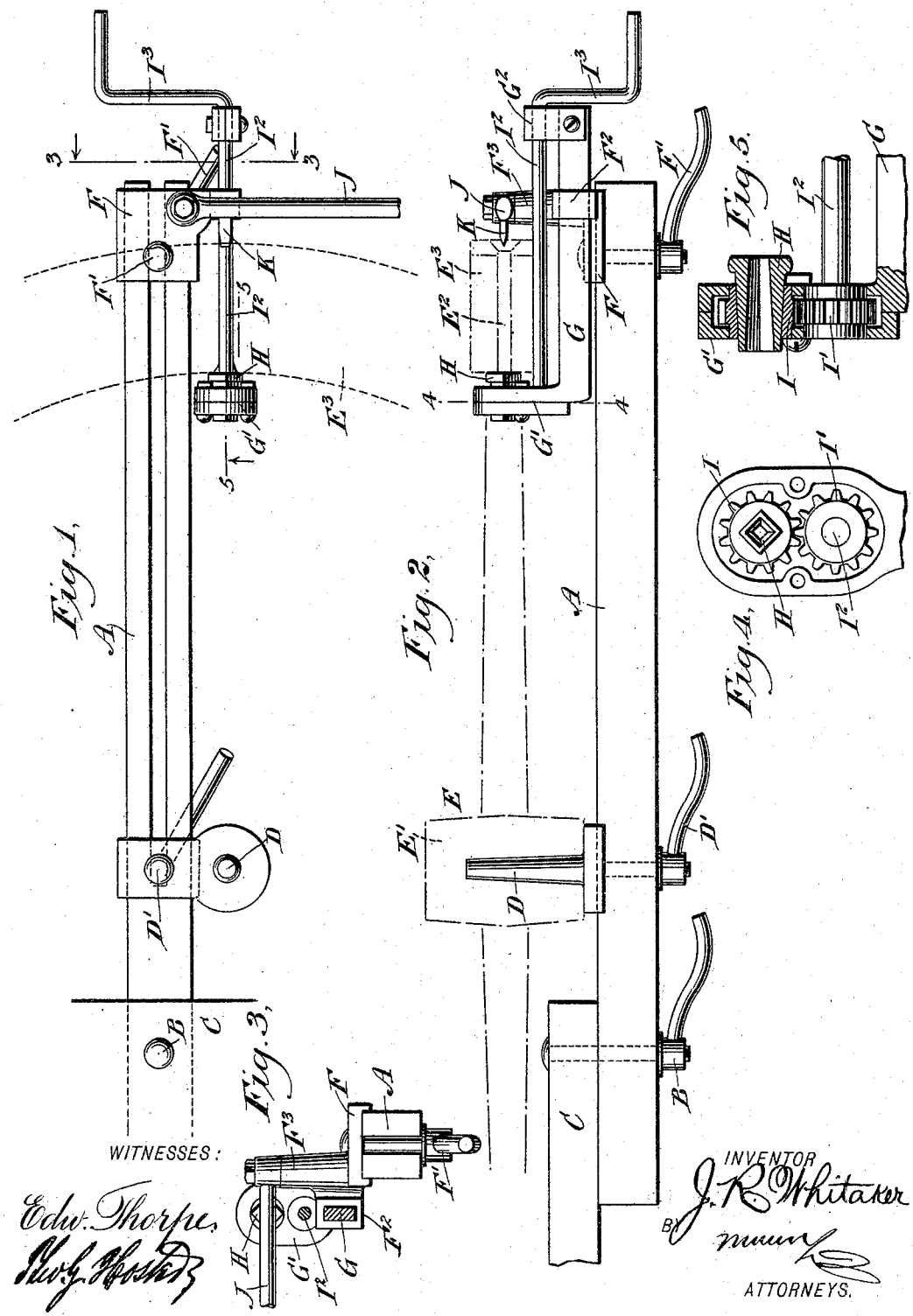

JOSEPH R. WHITAKER, OF WILMINGTON, OHIO.

TIRE-BOLTING MACHINE.

SPECIFICATION forming part of Letters Patent No. 611,540, dated September 27, 1898.

Application filed March 30, 1898. Serial No. 675,781. (No model.)

*To all whom it may concern:*

Be it known that I, JOSEPH R. WHITAKER, of Wilmington, in the county of Clinton and State of Ohio, have invented a new and Improved Tire-Bolting Machine, of which the following is a full, clear, and exact description.

The object of the invention is to provide a new and improved tire-bolting machine which is simple and durable in construction, very effective in operation, and arranged to securely hold the bolt in place while the nut is screwed on or off and allow sufficient adjustment of the various parts for using the machine conveniently on different-sized wheels and rims.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1 is a plan view of the improvement. Fig. 2 is a side elevation of the same. Fig. 3 is a transverse section of the same on the line 3 3 of Fig. 1. Fig. 4 is an enlarged face view of the gearing, with part of the casing removed, on the line 4 4 in Fig. 2; and Fig. 5 is an enlarged sectional side elevation of the same on the line 5 5 of Fig. 1.

The improved tire-bolting machine is mounted on a support A, preferably made in the form of a slotted beam, as plainly shown in Fig. 1, and fastened at its inner end by a clamping-bolt B to a bench C or other device. On the support A is held adjustably a hub-pin D, adapted to be fastened in place on the support by a clamping-bolt D', as plainly shown in the drawings, the said pin D being adapted to receive the hub E' of a wheel E, extending horizontally, as indicated in dotted lines in Figs. 1 and 2. On the outer end of the support A is held adjustably a slide F, adapted to be fastened in place by a clamping-bolt F', and on the said slide is formed a bearing $F^2$, in which is held to slide longitudinally a frame G, carrying at its inner end a gear-casing G', preferably made in sections and containing gear-wheels I I' in mesh with each other and journaled in the said casing, the gear-wheel I having a central tapering opening for the reception of a nut-jaw H, adapted to engage the nut of a bolt $E^2$, extending in the rim $E^3$ of the wheel E, as indicated in dotted lines in Fig. 2. The shank of the nut-jaw H is tapering to correspond to the opening in the gear-wheel I, as plainly shown in Fig. 5, to permit of conveniently removing the said nut-jaw H and replacing it by another having a different-sized opening, according to the size of the nut to be engaged by the jaw.

The gear-wheel I' is secured on a shaft $I^2$, extending longitudinally and journaled with its outer end in a bearing $G^2$, carried by the frame G, the extreme outer end of the shaft being provided with a crank-arm $I^3$ for conveniently turning the shaft and rotating the gear-wheel I' and with it the gear-wheel I, and consequently the jaw H, to screw the nut inward or outward on the bolt $E^2$, according to the direction in which the crank-arm $I^3$ is turned.

In order to prevent the bolt $E^2$ from turning while the nut is screwed on or unscrewed therefrom, I provide the slide F with a post $F^3$, on which is fulcrumed a hand-lever J, carrying a holding-tool K, in the form of a screw-driver, for engaging the slot in the head of the bolt $E^2$ to prevent the latter from turning.

Now it will be seen that by the arrangement described the slide F and pin D may be so adjusted relatively to each other on the support A as to accommodate any-sized wheel on which the nuts are to be screwed upon the bolts $E^2$ in the rim $E^3$. When the desired adjustment is made and the wheel is placed in position, then the rim $E^3$ thereof rides on the top of the shaft $I^2$ or extends slightly above the same, the jaw H being in alinement with the bolts $E^2$ and the tool K in alinement with the heads of the bolts, as indicated in Fig. 2. Now the operator can readily slide the frame G inward to bring the jaw H a suitable distance away from the inner end of the rim $E^3$ to permit of turning the wheel E until a bolt $E^2$ is in alinement with a nut. Then the operator pulls the frame outward to engage the jaw H with the nut on the inner end of the bolt $E^2$ and at the same time swings the lever J inward to engage the tool K with the slot in the bolt-head and then turns the handle I³ and turns the nut on the bolt E² either inward or outward, as the case may be. Thus nuts may be removed from the bolts or screwed thereon, it being understood that in the latter case the nuts may be inserted in the jaw previous to moving the frame G into an outermost position for bringing the nut in contact with the inner threaded end of the bolt. When the nut has been screwed upon the bolt, the operator swings the handle J outward to disengage the tool K from the head of the bolt and then shifts the frame G inward to move the jaw out of engagement with the nut. The wheel E is now again turned to bring the next bolt E² in alinement with the device, and the above-described operation is repeated.

By having the frame G slidable it is evident that the device can be readily used on rims of different thicknesses, besides allowing for any change in the size of the wheel itself.

Having thus fully described my invention, I claim as new and desire to secure by Letters Patent—

1. A tire-bolting machine, comprising a support, a hub-pin adjustable on said support, means for holding the hub-pin in place on the support, a slide adjustable on the support and formed with a bearing, means for holding the slide in position, a frame mounted to move in said bearing of the slide, and carrying at its inner end a casing, a gearing in said casing, and a nut-jaw carried by one of the gear-wheels of said gearing, and adapted to engage the nut of a tire-bolt, substantially as shown and described.

2. A tire-bolting machine, comprising a slotted beam provided at one end with means for securing it to a suitable support, a hub-pin held adjustable on said beam, a clamping device for holding said hub-pin in place, a slide adjustable on the outer end of said beam, the said slide being provided with a post and also formed with a bearing, a frame movable in the said bearing and carrying a casing at its inner end, meshing gear-wheels held in said casing, one of which is provided with a central tapered opening, a nut-jaw removably fitted in said opening in the gear-wheel and adapted to engage the nut of a tire-bolt, a shaft connected with the other gear-wheel, and a lever fulcrumed on the post of the said adjustable slide and carrying a tool adapted to engage the slot in the head of the bolt, substantially as shown and described.

3. A tire-bolting machine provided with a support, a post adjustable on said support, a lever fulcrumed on said post and carrying a tool for engagement with the head of a tire-bolt, a sliding frame, and a gearing carried by the sliding frame, one of the gear-wheels of said gearing having an aperture forming a socket adapted to receive a nut-jaw, substantially as shown and described.

4. A tire-bolting machine provided with a support, a post adjustable on said support, a lever fulcrumed on the upper end of said post, and a tool carried by said lever and adapted to engage the slot in the head of a tire-bolt, substantially as described.

5. A tire-bolting machine provided with an adjustable slide, a post carried by the said slide, a lever fulcrumed on the post and carrying a tool adapted to engage the head of a tire-bolt, a frame having movement in the said adjustable slide, a gearing journaled on the said frame, one of the gear-wheels of said gearing being provided with a shaft journaled at its outer end in a bearing carried by the said frame, and provided at its extreme outer end with a crank-arm for driving the shaft and also for shifting the frame in its bearings, the other gear-wheel being provided with an aperture, and a nut-jaw removably fitted into the said aperture, substantially as shown and described.

6. A tire-bolting machine, comprising a slotted bar, means for attaching one end of said bar to a suitable support, a hub-pin adjustably held on said slotted bar, a slide adjustable on the free end of said slotted bar and formed at one side with an upwardly-extending post and a laterally-projecting slotted lug forming a bearing, a frame movable in the said bearing, a gearing journaled on the frame, a nut-jaw carried by one of the gear-wheels of said gearing, the other gear-wheel being provided with a shaft, and a lever fulcrumed on the upper end of the post of the adjustable slide, and carrying a tool for engagement with the head of a tire-bolt, substantially as shown and described.

JOSEPH R. WHITAKER.

Witnesses:
 THOS. M. HUNT,
 A. R. BROWN.